Figure 1:
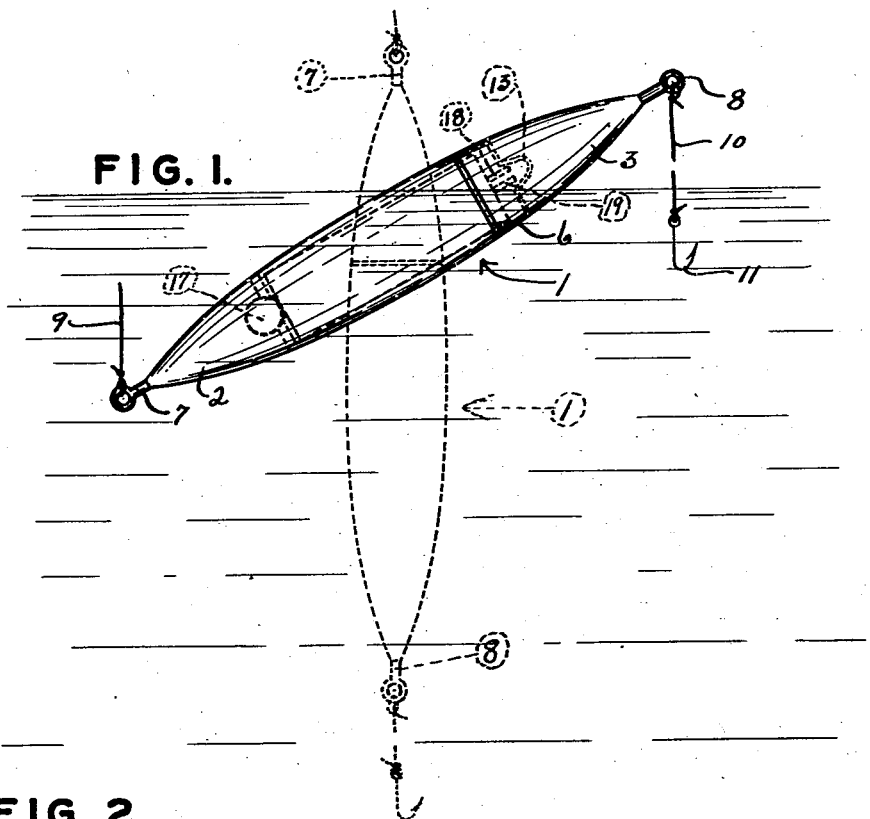

Sept. 4, 1934.   H. V. WHITE   1,972,724

AUTOMATICALLY ILLUMINATING FLOAT

Filed Feb. 15, 1932

Holland V. White
INVENTOR

By Loyal J. Miller
ATTORNEY

Patented Sept. 4, 1934

1,972,724

UNITED STATES PATENT OFFICE 1,972,724

AUTOMATICALLY ILLUMINATING FLOAT

Holland V. White, Hinton, Okla., assignor to William Seigle and Maurice Seigle

Application February 15, 1932, Serial No. 592,892

9 Claims. (Cl. 43—17)

My invention relates to floats, and more particularly to a fishing float which will automatically become illuminated when a fish bites.

The objects of my invention are to provide a device of this class which is new, novel, practical and of utility; which is particularly adapted to night fishing; which will immediately acquaint a fisherman when a fish bites the fish lure; which will remain illuminated during a cast thus acquainting a fisherman as to the spot struck, but which will at once become extinguished when the cast is completed and the device rests upon the surface of the water; which will be positive in action even though the fish strikes at an angle to the surface of the water; which will be comparatively cheap to manufacture; which will be durable; and, which will be efficient in accomplishing all of the purposes for which it is intended.

At the present time the efficiency with which night fishing may be accomplished is considerably impaired by the darkness. It is a hard matter to cast efficiently when the float is invisible, and many fish have been lost because the fisherman did not know when a fish was biting.

Applicant's device in practice has proven practical in accomplishing the purposes for which it is intended especially along this line.

Figure 2:
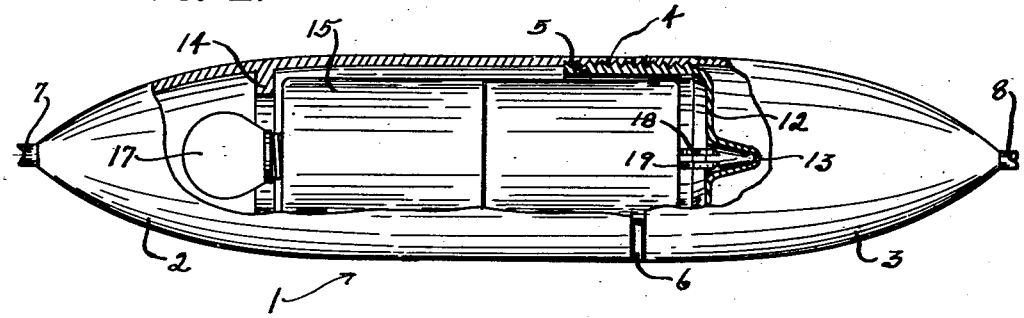

In the drawing;

Figure 1 is a perspective view of the device showing its normal position in the water, and showing in dotted lines its altered position when stress is placed on the hook; and, Fig. 2 is a side elevational view partially broken away and disclosing the interior mechanism.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

One practical embodiment of the invention as illustrated in the accompanying drawing, comprises:

A hollow shell or housing 1 consisting of two complemental sections 2 and 3, the inner surfaces of the inner ends of which are provided with threads 4. Said housing 1 is made of some desired transparent material, or if desired only partially so. Threads 4 are adapted to engage a metal nipple 5 which acts as a means of connecting the sections together, and a resilient gasket 6 hermetically closes the housing between the sections. The opposite ends of said sections 2 and 3 are provided with eyes 7 and 8 which may or may not be pivotally mounted, as desired. Eye 7 is adapted to be attached to a fishing line 9 leading to a desired anchorage such as a fishing pole or the like, not shown, while said eye 8 is adapted to connect a line 10 leading to a fishhook 11 or other desired fish lure. Said nipple 5 has one closed end 12 which is provided with a hollow axial protrusion 13, substantially conical in shape. Said section 2 is provided on its interior surface with an inwardly extending protrusion 14, the office of which will be more fully described hereinbelow.

Slidably disposed within said housing 1, and between said protrusion 14 and the end 12 of said nipple 5, is provided the usual dry-cell battery 15 equipped with a light bulb 17. Said battery 15 is usual except that both of its terminals 18 and 19 extend outwardly and axially through the end which lies nearest the end 12 of said nipple 5. Said terminals 18 and 19 lie parallel and are spaced slightly apart, and their free ends are complementally formed substantially conical, so that when the battery 15 slides toward said end 12 of the nipple 5, the inner surface of the protrusion 13 will bridge between the terminals and close the electrical circuit for illuminating said light bulb 17.

It is to be understood that although two lines 9 and 10 have been shown and described, that the eyes 7 and 8 might be attached to a single line at a point intermediate its ends with the same result.

In operation the device will be so balanced that it will float with the eye 7 beneath the surface of the water and the eye 8 will be positioned slightly above the surface of the water as illustrated. This position will normally slide the battery 15 downwardly against the protrusion 14, and the terminals 18 and 19 will be withdrawn from contact with the inner surface of said protrusion 13, and consequently the circuit will be opened and the bulb 17 extinguished. When a fish bites the hook 11, or any lure supported by said line 10, the position of the device will be altered as depicted by dotted lines in Fig. 1, and the battery 15 will then slide downwardly bringing the terminals 18 and 19 into contact with the inner surface of said protrusion 13. The circuit will thus be automatically closed and the bulb 17 automatically illuminated.

It may be seen that by the exterior conical shape of the terminals 18 and 19, and by the interior conical shape of the protrusion 13, a positive connection is had between the terminals regardless at what angle the device is positioned, so long as the battery 15 is at the end of its throw away from the protrusion 14. The action of the terminals and the protrusion 13 is somewhat similar to that of a universal joint.

It may be seen that the lines 9 and 10 might be mechanically attached within the housing to the respective opposite ends of the battery and the contact between the terminals 18 and 19 could thus be caused by any pull exerted on the line 10 which would physically move the battery 15. It is also possible to work out many other mechanical organizations whereby the electrical connection could be had by a pull exerted on the lines, and it is to be understood that this invention anticipates such mechanical organizations. The device might also be designed in such a manner that certain parts thereof will be carried exteriorly of the float.

Having thus described my invention, what is claimed and desired to be secured by Letters Patent, is:

1. A fishing float embodying a hermetically closed transparent housing having exterior means for connecting a fishing line, a battery slidably mounted within the housing and free to be moved longitudinally therein by gravity, and means carried by the housing for energizing a signal when the position of the housing is altered from the normal, said housing being so balanced that only one end will normally be submerged when it is afloat.

2. A fishing float embodying a hollow hermetically closed transparent housing having exterior means for connecting a fishing line, said housing being so balanced that only one end is normally submerged when it is afloat, a battery slidably mounted within the housing and free to be moved longitudinally therein by gravity, an electric light bulb carried by the battery, and means for illuminating said bulb when sufficient pull is exerted upon the line to expose the submerged end.

3. A float consisting of a hollow hermetically closed housing having a transparent portion which is normally submerged when the housing is afloat, said housing having exterior means for connecting a fishing line, an electric light bulb carried by said float and visible through said transparent portion, a battery slidably mounted within the housing and free to be moved therein by gravity, said battery for furnishing current to illuminate said bulb, and means within the housing for closing a circuit and illuminating said bulb when sufficient pull is exerted upon the line to expose the normally submerged portion and thus move the battery within the housing.

4. A fishing float embodying a hollow water tight partially transparent housing, an electric battery, a light bulb carried by the battery, said bulb and battery being slidably disposed within the housing for longitudinal movement therein by gravity, said housing being so balanced that it will normally repose in water with only one end submerged, and electrical connections within the housing for illuminating the bulb when the submerged end is exposed above the surface of the water and the battery is thus moved longitudinally to the end of its throw.

5. A fishing float embodying a hollow hermetically sealed housing each end of which is adapted to be connected to a fishing line, an electric battery, an electric light bulb carried by the battery, said battery and bulb being slidably disposed within the housing and free to be moved longitudinally therein by gravity, and electrical connections within the housing whereby the bulb is illuminated when the battery slides longitudinally toward one end thereof.

6. A fishing float embodying a hollow hermetically sealed partially transparent housing an electric battery being slidably disposed therein and free to be moved longitudinally therein by gravity, and a light bulb carried by the battery, said housing being so balanced that it will normally repose in water with only one end submerged, and electrical connections within the housing whereby the bulb is illuminated when the normal position of the housing is changed sufficiently to move the battery longitudinally therein.

7. A fishing float embodying a hollow water tight housing having one end portion constructed of transparent material, an electric battery, a light bulb carried thereby, said bulb being visible through the transparent portion of the housing, said battery being slidably disposed for longitudinal movement within the housing and free to be moved longitudinally therein by gravity, and electrical connections within the housing whereby the bulb will become illuminated when the housing assumes a position with the transparent portion uppermost and the battery is moved thereby to the end of its throw.

8. A fishing float embodying a hollow water tight housing having at least one end portion constructed of transparent material, said housing being so balanced that the transparent end only will normally be submerged when the housing is afloat, an electric battery movable longitudinally within the housing by gravity, an electric light bulb within the transparent portion of the housing, and electrical connections for illuminating the bulb when the housing assumes a position with the transparent portion uppermost and the battery is thereby moved to the end of its throw.

9. A fishing float embodying a hollow elongated hermetically closed housing having at least one end portion transparent, and being so balanced that the transparent end is normally submerged when the housing is afloat, a battery within the housing and free to be moved longitudinally by gravity with relation thereto, an electric light bulb carried by the battery, and electrical connections within the housing for illuminating the bulb when the normally submerged end of the housing is exposed and the battery is thus moved longitudinally within the housing.

HOLLAND V. WHITE.